United States Patent
Shi

(10) Patent No.: US 9,531,270 B2
(45) Date of Patent: Dec. 27, 2016

(54) POWER MANAGEMENT CIRCUIT AND METHOD

(75) Inventor: Justin Shi, Ann Arbor, MI (US)

(73) Assignee: TAIWAN SEMICONDUCTOR MANUFACTURING COMPANY, LTD. (TW)

( * ) Notice: Subject to any disclaimer, the term of this patent is extended or adjusted under 35 U.S.C. 154(b) by 374 days.

(21) Appl. No.: 13/180,241

(22) Filed: Jul. 11, 2011

(65) Prior Publication Data

US 2013/0015827 A1    Jan. 17, 2013

(51) Int. Cl.
| | |
|---|---|
| H02M 3/156 | (2006.01) |
| H02M 3/158 | (2006.01) |
| H02J 7/00 | (2006.01) |
| H02M 1/00 | (2006.01) |

(52) U.S. Cl.
CPC .......... H02M 3/1582 (2013.01); H02J 7/0068 (2013.01); *H02M 3/156* (2013.01); *H02M 2001/0022* (2013.01); *H02M 2001/0045* (2013.01)

(58) Field of Classification Search
CPC ................ H02M 3/156–3/158; H02M 3/1582; H02M 2001/0022; H02M 2001/0045; H02M 3/145; H02J 7/0068; G05F 3/10
USPC .................................................. 323/282–285
See application file for complete search history.

(56) References Cited

U.S. PATENT DOCUMENTS

| | | | |
|---|---|---|---|
| 7,230,408 B1* | 6/2007 | Vinn | H02M 3/156 323/273 |
| 7,994,762 B2* | 8/2011 | de Cremoux et al. | 323/271 |
| 8,193,784 B2* | 6/2012 | Seberger et al. | 323/222 |
| 8,508,208 B2* | 8/2013 | Klein | H02M 3/1582 323/282 |
| 8,723,490 B2* | 5/2014 | Moussaoui et al. | 323/259 |
| 2006/0262579 A1* | 11/2006 | Chou | 363/63 |
| 2009/0153118 A1* | 6/2009 | Sato et al. | 323/282 |
| 2009/0200995 A1* | 8/2009 | Tran et al. | 323/222 |
| 2010/0039080 A1* | 2/2010 | Schoenbauer et al. | 323/234 |
| 2010/0164446 A1* | 7/2010 | Matsuo et al. | 323/282 |
| 2010/0320839 A1* | 12/2010 | Walter et al. | 307/43 |
| 2012/0062189 A1* | 3/2012 | Wang | H02M 3/156 323/271 |

FOREIGN PATENT DOCUMENTS

TW    200642227    12/2006

OTHER PUBLICATIONS

Texas Instruments, www.ti.com, SLUS615B—Dec. 2004—Revised Jul. 2007, "Single-Chip Charger and DC/DC Converter IC for Portable Applications (bq2501x)".

(Continued)

*Primary Examiner* — Timothy J Dole
*Assistant Examiner* — Shahzeb K Ahmad
(74) *Attorney, Agent, or Firm* — Hauptman Ham, LLP

(57) ABSTRACT

A power management circuit and method are described. In the method, whether a first voltage and/or a voltage source are present is determined. Based on a first result of the determination, the first voltage is converted to a second voltage. A boost converter is used to convert the second voltage to a third voltage. Alternatively, based on a second result of the determination, a buck converter is used to convert the third voltage to the second voltage.

22 Claims, 5 Drawing Sheets

(56) References Cited

OTHER PUBLICATIONS

Texas Instruments, www.ti.com, SLUS694E—Mar. 2006—Revised Oct. 2009, "Single-Chip Li-Ion Charge and System Power-Path Management IC".

Texas Instruments, www.ti.com, SLUS606O—Jun. 2004—Revised Mar. 2010, "Synchronous Switchmode, Li-Ion and Li-Polymer Charge-Management IC with Integrated Power FETs (bqSWITCHER)".

Wang Ling et al., "Slope Compensation Circuit of Current Mode Control PWM Boost Converter", Microcomputer Information (SOC) 2007; 1008-0570 (2007) 06-2-0277-02; pp. 277-278 and 255.

\* cited by examiner

US 9,531,270 B2

POWER MANAGEMENT CIRCUIT AND METHOD

FIELD

The present disclosure is related to electrical power management.

BACKGROUND

Traditionally, when a voltage source providing a direct current (DC) voltage is connected to a battery-powered electronics system, a charger or a battery management circuit uses the DC voltage to charge the battery. Additionally, a power management unit (PMU) uses the DC voltage to power the applications in the system. On the other hand, when the DC voltage is not connected to the system, the battery supplies the voltage and powers the applications. These approaches generally use both a battery management circuit and a power management unit (PMU) to manage the power, e.g., to decide when to take the power from the battery and when to take the power from the DC voltage source. Usually, the battery management circuit and the PMU are two separate units built on complementary chips. Efficient power regulation and reduced form factor are two key parameters to mobile electronics system design.

In a power management system (PMS) known to the applicant, both the battery management circuit and the PMU use switching DC-DC architectures to improve efficiency and minimize power loss. A switching DC-DC architecture typically employs a power inductor. The cost of building the charger and the PMU using discrete power inductors continues to be expensive, because the cost of discrete inductors has not decreased significantly even though the cost of the silicon to build the integrated circuit has dropped in many situations, the cost of discrete inductors almost exceeds the cost of the total silicon. Integrating the power inductors into the semiconductor fabrication and assembly process is cumbersome and cost inhibitive.

BRIEF DESCRIPTION OF THE DRAWINGS

The details of one or more embodiments of the disclosure are set forth in the accompanying drawings and the description below. Other features and advantages will be apparent from the description, drawings, and claims.

Like reference symbols in the various drawings indicate like elements.

DETAILED DESCRIPTION

Figure 1A:
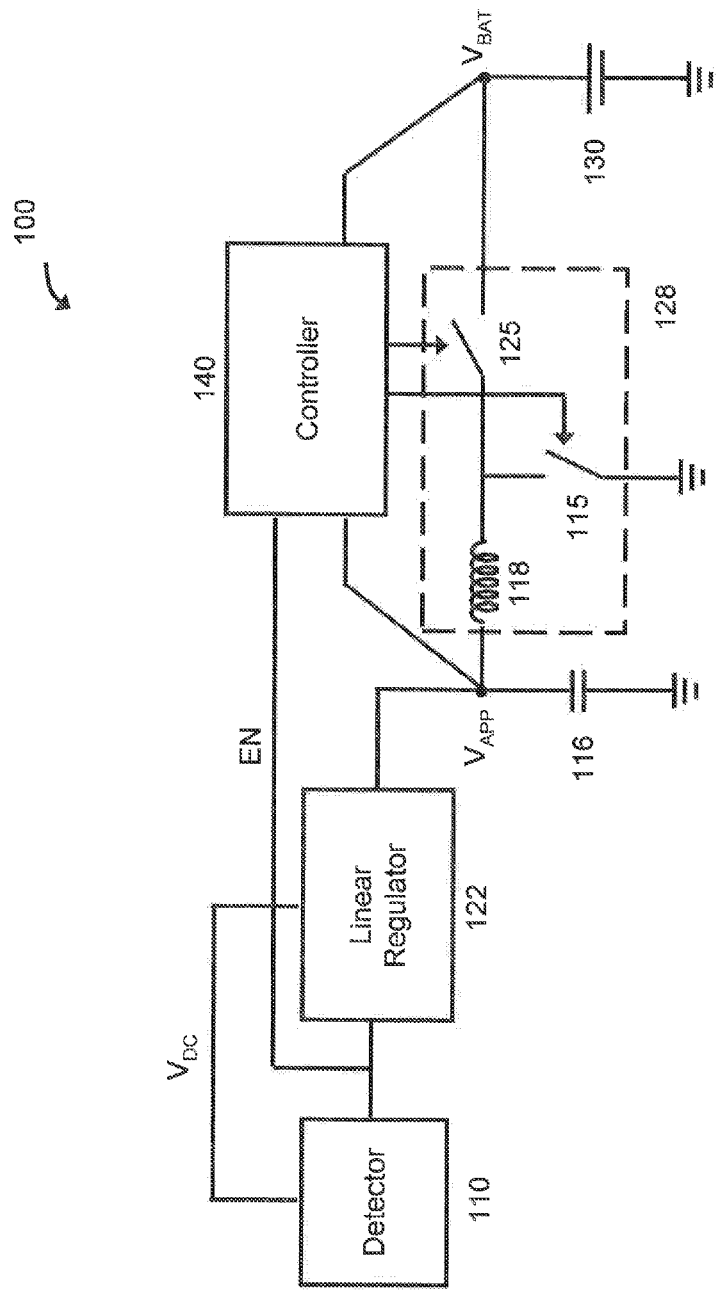
FIG. 1A is a block diagram of a circuit, in accordance with some embodiments.

Embodiments, or examples, illustrated in the drawings are disclosed below using specific language. It will nevertheless be understood that the embodiments and examples are not intended to be limiting. Any alterations and modifications in the disclosed embodiments, and any further applications of the principles disclosed in this document are contemplated as would normally occur to one of ordinary skill in the pertinent art. Reference numbers may be repeated throughout the embodiments, but they do not require that feature(s) of one embodiment apply to another embodiment, even if they share the same reference number.

Some embodiments have one or a combination of the following features and/or advantages. The power management system (PMS) uses fewer discrete inductors. The total area of the printed circuit board (PCB) that contains the inductors, as a result, is reduced. The cost of fabricating the PMS is also reduced because the number of relatively high cost inductors has been reduced. The PMS is more power efficient compared with other traditional architectures that employ non-inductive based DC-DC regulators. The charger and the PMU are combined, enabling a reduction in chip size and component count for a more integrated and compact electrical system. Various embodiments are applicable to systems that receive a single input voltage but generate output voltages both lower and higher than the input voltage. In some embodiments, an application circuit is powered and the battery is charged at the same time. The application voltage is boosted to charge the battery. A control circuit is used to form both a boost converter and a buck converter. In some embodiments, the battery voltage is down converted to supply the application voltage. Various embodiments are power efficient, because they use switching DC-DC converters to both charge the battery and provide the application voltage.

Exemplary Circuits

FIG. 1A is a block diagram of an exemplary circuit 100, in accordance with some embodiments.

Circuit 100 receives DC voltage $V_{DC}$ from a power source (not shown), such as an alternating current to direct current (AC-DC) adapter, a Universal Serial Bus power source, a car charger, etc. In some embodiments, voltage $V_{DC}$ is converted from an AC voltage. Voltage detector 110 detects whether voltage $V_{DC}$ is present and generates signal EN. Signal EN turns on linear regulator 122, which supplies the application voltage $V_{APP}$. Inductive switching circuit 128 includes inductor 118, switch 115, and switch 125. Controller 140 controls the operation of switches 115 and 125. Controller 140, with switches 115 and 125 and battery 130, form a boost or step-up converter. Capacitor 116 serves as a filter to reduce ripples on voltage $V_{APP}$ and also functions as part of a buck or step-down converter. Circuit 100 operates in at least two modes of operation, depending on the presence of voltage $V_{DC}$. In a first mode of operation when voltage $V_{DC}$ is present, linear regulator 122 uses voltage $V_{DC}$ to power various application circuits (not shown) with voltage $V_{APP}$. In addition, inductor 118, switch 115, switch 125, battery 130, and controller 140 function as a boost converter converting voltage $V_{APP}$ to voltage $V_{BAT}$ to charge battery 130. In a second mode of operation when voltage $V_{DC}$ is not present, capacitor 116, inductor 118, switch 115, switch 125, and controller 140 function as a buck converter that converts the battery voltage $V_{BAT}$ to supply voltage $V_{APP}$.

Figure 1B:
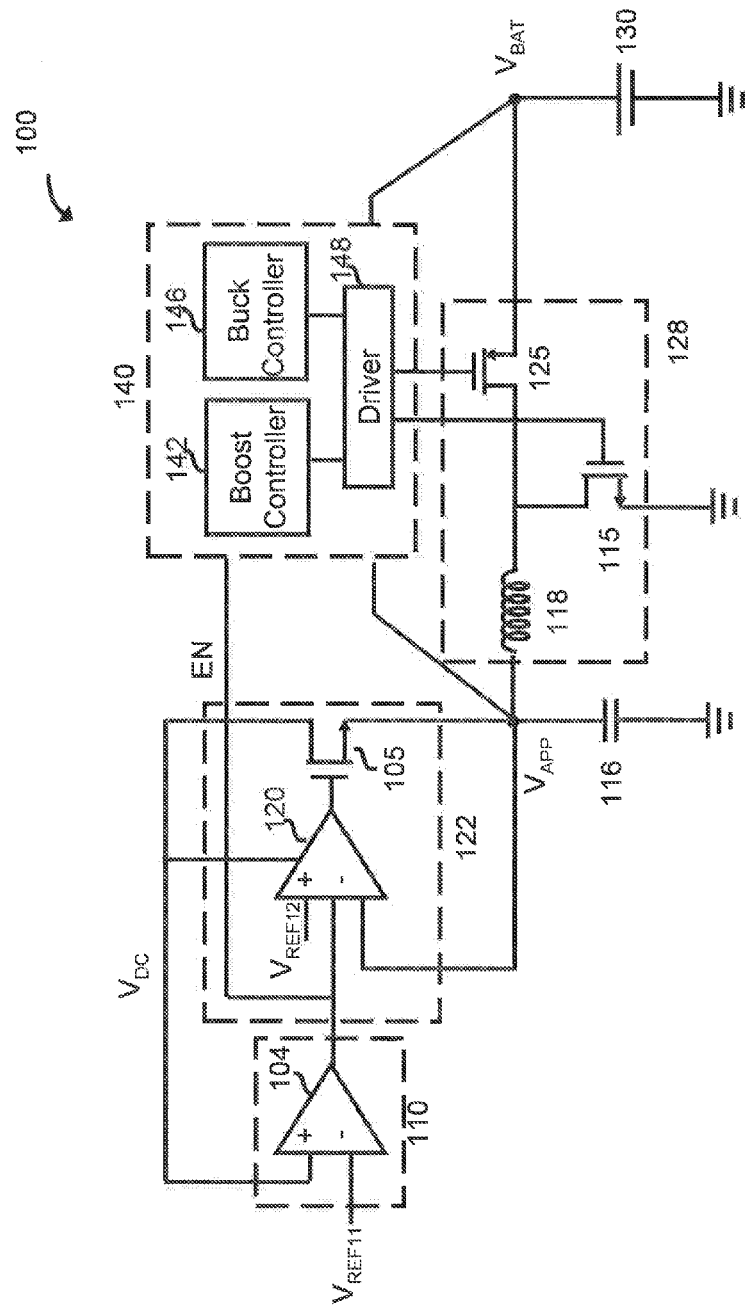
FIG. 1B is a diagram of the circuit in FIG. 1A in which various circuitries are shown with exemplary implementations, in accordance with some embodiments.

FIG. 1B is a diagram of circuit 100 in which various circuitries are shown with exemplary implementations, in accordance with some embodiments. The below description is in the context of an exemplary cellular phone powered by a DC voltage source that generates voltage $V_{DC}$, but the disclosed embodiments are not so limited.

In some embodiments, DC voltage detector 110 comprises a comparator 104, which compares voltage $V_{DC}$ to a known reference voltage $V_{REF11}$. DC voltage detector 110 detects whether the DC voltage source and thus voltage $V_{DC}$ is present, and generates signal EN. In some embodiments, voltage $V_{DC}$ is present when the DC voltage source is plugged into the cellular phone, and is not present when the DC voltage source is not plugged into the cellular phone. In some embodiments, when the DC voltage source is present, voltage $V_{DC}$ at the positive terminal of comparator 104 is higher than voltage $V_{REF11}$ at the negative terminal of comparator 104. As a result, comparator 104 generates a high logic value (High) for signal EN. But if voltage $V_{DC}$ is not present, the voltage at the positive terminal of comparator 104 is lower than voltage $V_{REF11}$ at the positive terminal. Comparator 104 thus generates a low logic value (Low) for signal EN. Signal EN is used to turn on or off linear regulator 122. For example, when signal EN is High, linear regulator 122 is turned on. But if signal EN is Low, linear regulator 122 is turned off.

Linear regulator 122 converts a higher voltage $V_{DC}$ to a lower voltage $V_{APP}$ based on voltage $V_{REF12}$. In this context, voltage $V_{DC}$ serves as the voltage source for voltage $V_{APP}$. In some embodiments, voltage $V_{DC}$ is about 5.0 V to 20.0 V while voltage $V_{APP}$ is about 0.9 V to 1.2 V. Further, voltage $V_{APP}$ is supplied to various application components of the cellular phone such as an application processor, a based band processor, a digital system-on-chip (SOC), a blue tooth (BT) transceiver, an audio codec, a camera module, etc.

Regulator 122 includes amplifier 120 and transistor 105. When signal EN is low, both amplifier 120 and transistor 105 are off. As a result, voltage $V_{APP}$ is electrically disconnected from voltage $V_{DC}$. When signal EN is high however, both amplifier 120 and transistor 105 are on. Amplifier 120 then regulates the voltage value of voltage $V_{APP}$ to the same voltage value of voltage $V_{REF12}$. Stated differently, amplifier 120 equalizes voltage $V_{REF12}$ and voltage $V_{APP}$ at the two respective terminals of amplifier 120, in some embodiments, a target value of voltage $V_{APP}$ is determined, and voltage $V_{REF12}$ is provided for the predetermined voltage $V_{APP}$ to be generated. Effectively, the target voltage value of voltage $V_{APP}$ is the provided voltage value of voltage $V_{REF12}$.

Linear regulator 122 is used for illustration. Other voltage converters converting voltage $V_{DC}$ to voltage $V_{APP}$ and/or other implementations of linear regulator 122 are within the scope of various embodiments. For example, NMOS transistor 105 is replaced by a PMOS transistor. In such a situation, voltage $V_{APP}$ and related circuitry including inductor 118 are connected to the drain of the PMOS transistor, and are fed back to the positive terminal of amplifier 120. Voltage $V_{REF12}$ is then connected to the negative terminal.

In some embodiments, voltage $V_{APP}$ is supplied by either voltage $V_{DC}$ or voltage $V_{BAT}$. When voltage $V_{App}$ is provided by voltage $V_{DC}$, voltage $V_{APP}$ is also used to charge battery 130 through a boost converter. In other words, voltage $V_{APP}$ is also used to generate voltage $V_{BAT}$. When voltage $V_{DC}$ is not available, voltage $V_{BAT}$ serves as a voltage source for voltage $V_{APP}$ through a buck converter. Battery 130 is used for illustration. Other circuitries and devices that can be charged and provide the charged voltage for use by other applications are within the scope of various embodiments. Examples of such circuitries/devices include a charge reservoir, a capacitor, etc.

In the embodiment of FIG. 1B, switch 115 is implemented using an N-channel MOS (NMOS) transistor, and switch 125 is implemented using a P-channel MOS (PMOS) transistor. Other implementations for each of switch 115 and 125 are within the scope of various embodiments, including, for example, an NMOS transistor, a PMOS transistor, a Double-Diffused Metal Oxide Semiconductor (DMOS) transistor, an insulated gate bipolar transistor (IGBT), etc. As illustratively shown in FIG. 1B, the drain terminal (the drain) of NMOS transistor 115 is coupled to the drain of PMOS transistor 125. The source terminal (the source) of NMOS transistor 115 is coupled to ground. The source of PMOS transistor 125 is coupled to battery 130. When transistors 115 and/or 125 are implemented by a different type of transistor, the drain/source connections would be changed accordingly. For example, if both transistors 115 and 125 are PMOS transistors, the source of PMOS transistor 115 would be coupled to the drain of PMOS transistor 125. The drain of PMOS transistor 115 would be coupled to ground. If transistor 115 is a PMOS transistor and transistor 125 is an NMOS transistor, the source of PMOS transistor 115 would be coupled to the source of NMOS transistor 125, etc. The above connections are for illustration. Different connections for different types of transistors are within the scope of various embodiments and should be recognizable by persons of ordinary skill in the art after reading this document. Similarly, the voltage values at the gates of the transistors would be changed for different types of transistors. For example, when transistor 115 is an NMOS transistor and transistor 125 is a PMOS transistor as in FIG. 1B, a high voltage value at the gate terminal (the gate) of transistor 115 turns on transistor 115 and a low voltage value at the gate of transistor 125 turns on transistor 125.

In some embodiments, controller 140 includes a boost controller 142, a buck controller 146, and a driver circuit 148. Driver circuit 148 is coupled to transistors 115 and 125. Signal EN is used to selectively enable boost controller 142 or buck controller 146, and to couple driver circuit 148 to either boost controller 142 or buck controller 146. Effectively, signal EN is used to selectively couple either boost controller 142 or buck controller 146 to transistors 115 and 125 through driver circuit 148. For example, boost controller 142 is coupled to transistors 115 and 125 through driver circuit 148 when signal EN is High. In contrast, buck controller 146 is coupled to transistors 115 and 125 through driver circuit 148 when signal EN is Low. Driver circuit 148 is used for illustration. Other mechanisms selectively coupling boost controller 142 or buck controller 146 to transistors 115 and 125 are within the scope of various embodiments.

Figure 2:
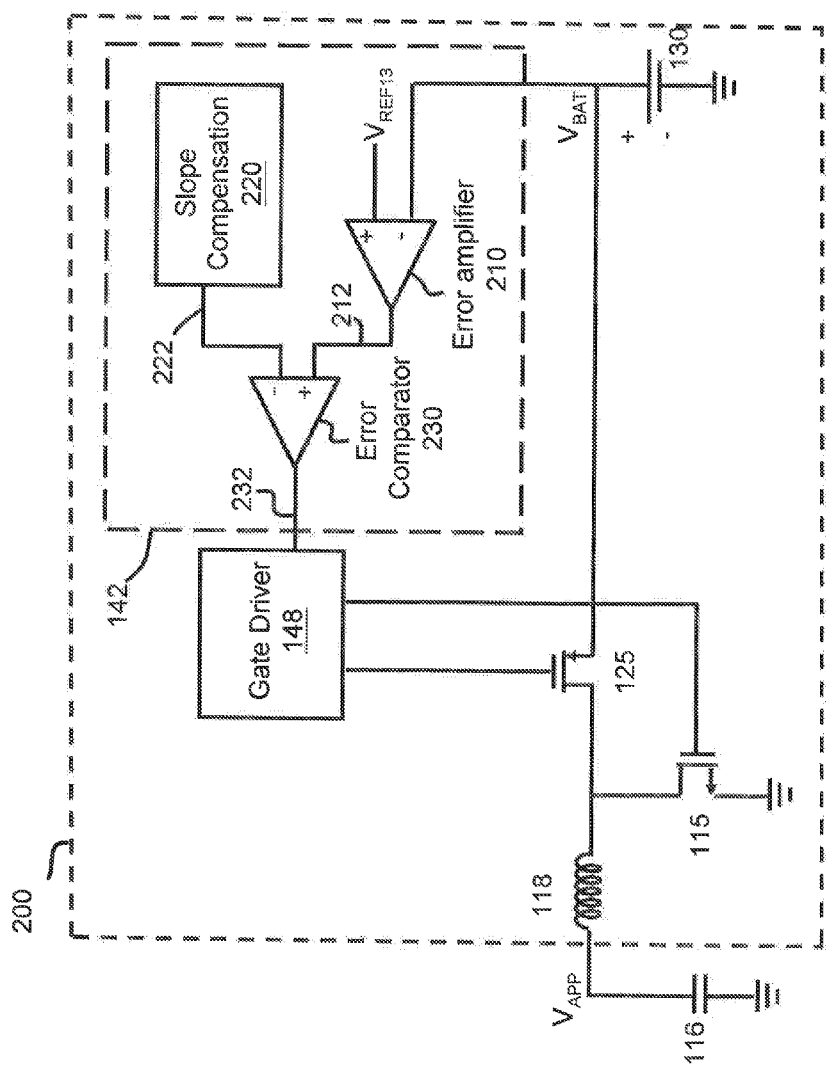
FIG. 2 is a diagram of a circuit illustrating an embodiment of a boost controller.

Boost controller 142, together with inductor 118, transistor 115, transistor 125, and battery 130 functions as a boost or a step-up DC-DC converter. An exemplary booster converter 200 is shown in FIG. 2. The boost converter receives voltage $V_{APP}$ as an input and generates voltage $V_{BAT}$ of battery 130. In some embodiments of the boost operation, voltage $V_{BAT}$ charges battery 130. Further, voltage $V_{APP}$ is about 0.9 V to 1.2 V while voltage $V_{BAT}$ is about 2.7 V to 4.2 V depending on the state of charge of battery 130. Boost controller 142 controls when to turn on or off transistors 115 and 125. In some embodiments, transistors 115 and 125 are turned on alternatively. For illustration, the boost converter is called in the on state when transistor 115 is on and transistor 125 is off. On the other hand, the boost converter is called in the off state when transistor 115 is off and transistor 125 is on.

In some embodiments, a cycle of the boost converter includes an on-time when the boost converter is on and an off-time when the boost converter is off. For illustration, the time period $T_{ON\_BT}$ represents the time the boost converter is on, and $T_{OFF\_BT}$ represents the time period when the boost converter is off, $D_{BT}$ is the duty cycle of the boost converter. During regulation, the relationship between duty cycle and voltage values in a boost converter follows the equations:

$$D_{BT}=T_{ON\_BT}/(T_{ON\_BT}+T_{OFF\_BT})$$

$$V_{BAT}=(1/(1-D_{BT}))*V_{APP}$$

or $$D_{BT}=1-(V_{APP}/V_{BAT}) \quad (1)$$

In some embodiments, voltage $V_{APP}$ is known, voltage $V_{BAT}$ fluctuates between 2.7 V-4.2 V. Boost controller 142, based on a particular value of voltage $V_{BAT}$ adjusts duty cycle $D_{BT}$ so that equation (1) is satisfied. When voltage $V_{BAT}$ changes, controller 142 adjusts duty cycle $D_{BT}$ accordingly so that equation (1) continues to be satisfied.

In some embodiments, when voltage $V_{DC}$ is not available or voltage $V_{APP}$ is disconnected from voltage $V_{DC}$, voltage $V_{APP}$ is supplied by voltage $V_{BAT}$. Buck controller 146 together with capacitor 116, inductor 118, transistor 115, and transistor 125 function as a buck or a step-down DC-DC converter. The buck converter receives voltage $V_{BAT}$ as an input and generates voltage $V_{APP}$ as an output. Buck controller 146 controls when to turn on or off transistors 115 and 125. For illustration, the buck converter is called in the on state when transistor 125 is on and transistor 115 is off. On the other hand, the buck converter is called in the off state when transistor 125 is off and transistor 115 is on.

In some embodiments, a cycle of the buck converter includes an on-time when the buck converter is on and an off-time when the buck converter is off. For illustration, the time period $T_{ON\_BK}$ represents the time the buck converter is on, and $T_{OFF\_BK}$ represents the time period when the buck converter is off, $D_{BK}$ is the duty cycle of the buck converter. During regulation, the relationship between duty cycle and voltage values in a buck converter follows the equations:

$$D_{BK}=T_{ON\_BK}/(T_{ON\_BK}+T_{OFF\_BK})$$

and $$V_{APP}=D_{BK}*V_{BAT} \quad (2)$$

In some embodiments, voltage $V_{APP}$ is known, voltage $V_{BAT}$ fluctuates between 2.7 V-4.2 V. Buck controller 146, based on a particular value of voltage $V_{BAT}$ adjusts duty cycle $D_{BK}$ so that equation (2) is satisfied. When voltage $V_{BAT}$ changes, controller 146 adjusts duty cycle $D_{BK}$ accordingly so that equation (2) continues to be satisfied.

The Boost Converter

FIG. 2 is a diagram of a booster converter 200, in accordance with some embodiments. Booster converter 200 is formed by boost controller 142, inductor 118, battery 130, transistor 115, and transistor 125. Capacitor 116 is shown for illustration. Boost converter 200 converts voltage $V_{APP}$ to voltage $V_{BAT}$.

Error amplifier 210 amplifies the voltage difference between battery voltage $V_{BAT}$ at the negative terminal of error amplifier 210 and a known reference voltage $V_{REF13}$ at the positive terminal of error amplifier 210. Voltage $V_{REF13}$ represents a target voltage value for battery 130. In some embodiments, voltage $V_{REF13}$ represents an actual target battery voltage. In some other embodiments, voltage $V_{REF13}$ is a scaled down version of the target battery voltage, and voltage $V_{BAT}$ is scaled down accordingly. Error amplifier 210 generates a signal on line 212 based on the voltage difference between inputs voltages $V_{BAT}$ and $V_{REF13}$.

In some embodiments, slope compensation circuit 220 compensates for undesired frequency components produced by the analog components in FIG. 2, such as capacitor 116, inductor 118, and battery 130. Slope compensation circuit 220 then generates a signal on line 222. Slope compensation circuit 220 increases the phase margin and stability of boost converter 200. In some embodiments, slope compensation circuit 220 also includes an oscillator circuit (not shown), which generates a periodic signal to set the frequency of the switching activity of switches 115 and 125.

Error comparator 230 compares the signals on lines 212 and 222, and generates a Pulse Width Modulated (PWM) signal on line 232. Based on the operation of error amplifier 210 and error comparator 230, the PWM signal on line 232 contains information for the target duty cycle $D_{BT}$.

Gate driver 148, based on the PWM signal on line 232, generates signals at the gates of transistors 115 and 125 to control transistors 115 and 125. Effectively, driver 148 controls the gate voltage of transistors 115 and 125 based on the PWM signal on line 232 to turn on and off transistors 115 and 125. Based on the switching of transistors 115 and 125 together with the operation of inductor 118 and battery 130, voltage $V_{BAT}$ is produced from voltage $V_{APP}$, which satisfies equation (1) above.

The Buck Converter

Figure 3:
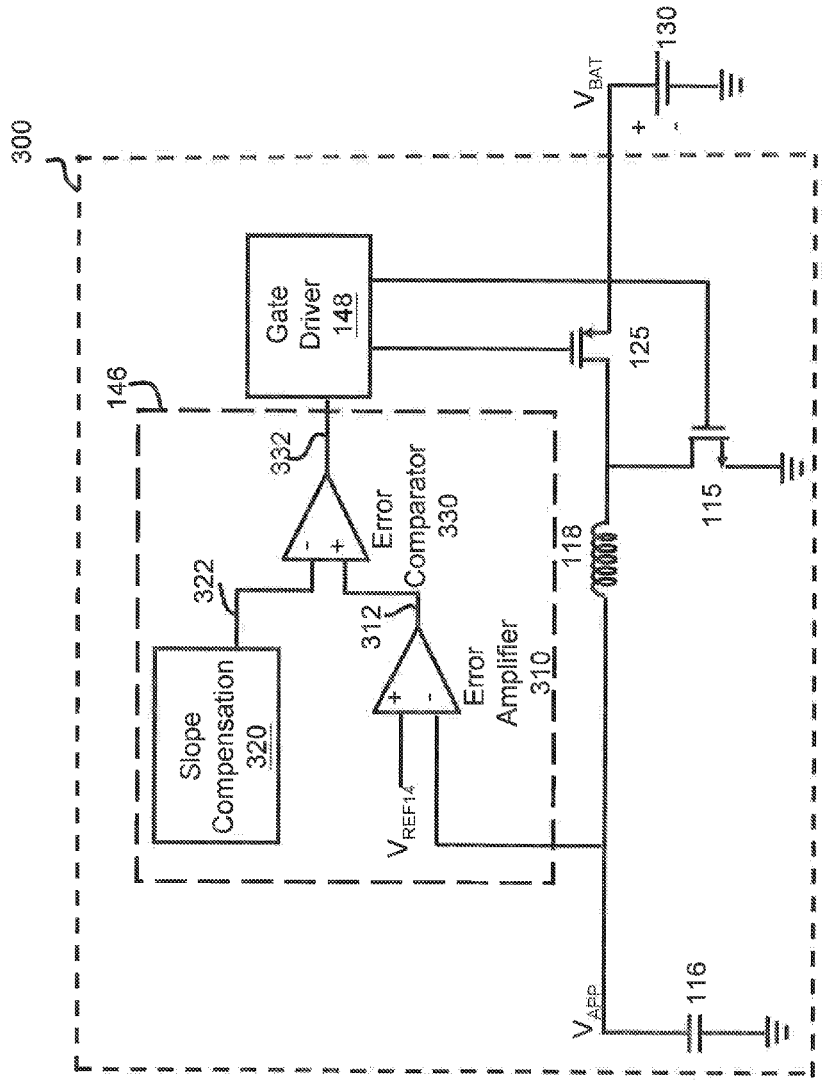
FIG. 3 is a diagram of a circuit illustrating an embodiment of a buck controller.

FIG. 3 is a diagram of a buck converter 300, in accordance with some embodiments. Buck converter 300 is formed by buck controller 146, inductor 118, capacitor 116, transistor 115, and transistor 125. Battery 130 is shown for illustration. Buck converter 300 converts voltage $V_{BAT}$ to voltage $V_{APP}$.

The operation of error amplifier 310, slope compensation circuit 320, and error comparator 330 is similar to the operation of the corresponding error amplifier 210, slope compensation circuit 220, and error comparator 230 in circuit 200. The operation of error amplifier 310, slope compensation circuit 320, and error comparator 330, however, contribute to the buck operation, and should be recognizable by persons of ordinary skill in the art.

Compared with circuit 200, error amplifier 310 receives voltage $V_{APP}$, instead of voltage $V_{BAT}$, at the negative terminal. Voltage $V_{APP}$ is compared to reference voltage $V_{REF14}$, which represents the target supply voltage of the application circuits (not shown). Similarly to error amplifier 210 receiving a scaled down version of voltage $V_{BAT}$, error amplifier 310 can also receive a scaled down version of the target voltage $V_{APP}$, and $V_{REF14}$ would be scaled down accordingly. Error amplifier 310 generates a signal on line 312, which represents the difference between voltage $V_{APP}$ and target reference voltage $V_{REF14}$. The signal on line 312 is compared to the output of slope compensation circuit 320 on line 322 by error comparator 330. The comparison output signal on line 332 of error comparator 330 is used as an input to gate driver circuit 148. Similar to the boost converter circuit 200, slope compensation circuit 320, in some embodiments, includes an oscillator circuit (not shown), which generates a clock signal to set the switching frequency of transistors 115 and 125.

Similar to the boost converter operation in circuit 200, gate driver 148 in circuit 300 controls the gate voltages of transistors 115 and 125 based on the PWM signal on line 332. Based on the turning on and off of transistors 115 and 125 together with the operation of inductor 118 and capacitor 116, voltage $V_{APP}$ is produced from voltage $V_{BAT}$, which satisfies equation (2) above.

In some embodiments, gate driver circuit 148 selects either the output signal on line 332 from error comparator 330 in circuit 300, or the output signal on line 232 from error comparator 230 in circuit 200, to generate signals at the gates of transistors 115 and 125. Effectively, the signal on line 232 in circuit 200 and the signal on line 332 in circuit 300 are selectively coupled to gate driver 148 in a boost or a buck operation, respectively. Driver circuit 148 controls the turning on and off of transistors 115 and 125 either based on the PWM signal from error comparator 230 in boost controller 142 or based on the PWM signal from error comparator 330 in buck controller 146. Gate driver 148 then generates the signals at the gates of transistors 115 and 125 to function as a boost converter 200 in FIG. 2 or as a buck converter 300 in FIG. 3, respectively. In some embodiments, a buffer, a level-shifter, etc., known by persons of ordinary skill in the art is implemented as driver 148. Other circuits for use as driver 148 are within the scope of various embodiments.

Exemplary Method

Figure 4:
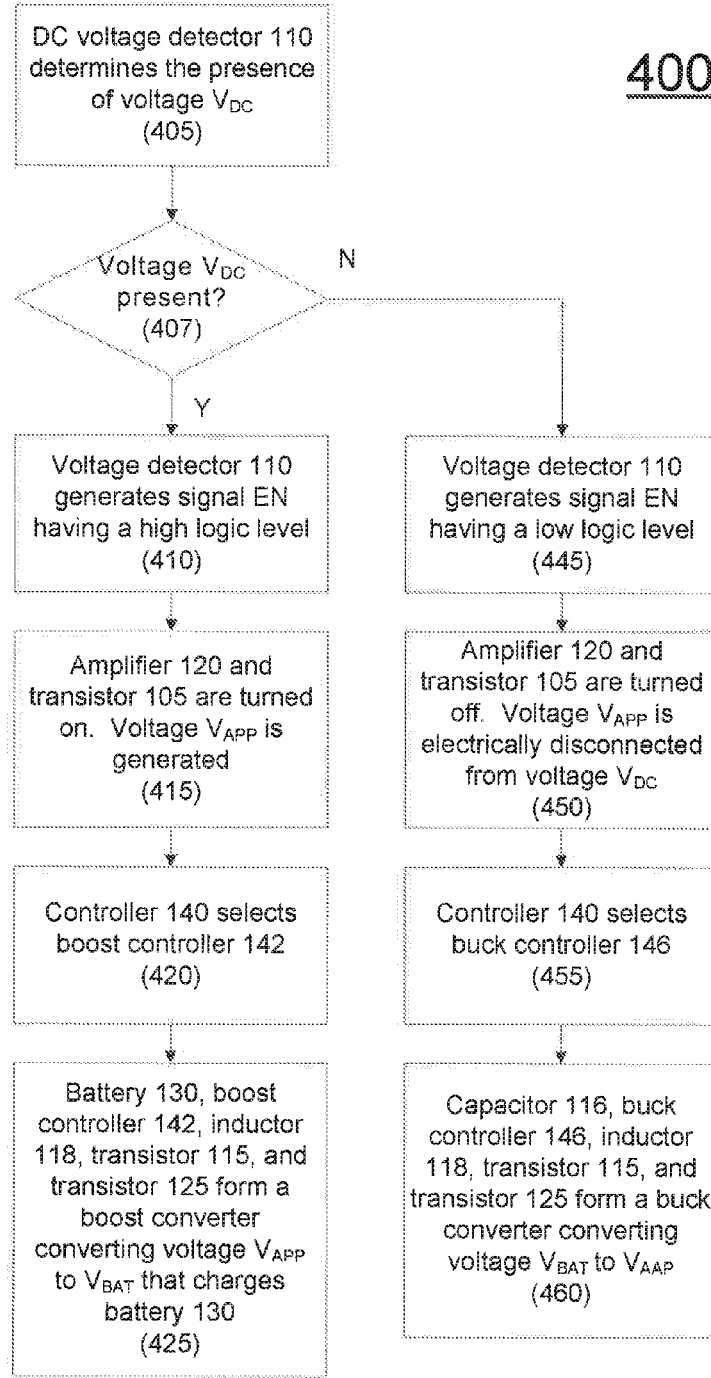
FIG. 4 is a flow chart illustrating a method of operating the circuit in FIG. 1, in accordance with some embodiments.

FIG. 4 is a flowchart 400 illustrating a method of operating circuit 100, in accordance with some embodiments.

In step 405, DC voltage detector 110 determines the presence of the voltage source generating voltage $V_{DC}$ and/or voltage $V_{DC}$. For illustration, DC voltage detector 110 determines the presence of voltage $V_{DC}$.

In step 407, if it is determined that voltage $V_{DC}$ is present, voltage detector 110 generates signal EN having a high logic level in step 410.

In step 415, sense amplifier 120 is turned on based on the high voltage level of signal EN. Transistor 105 is controlled by sense amplifier 120. Voltage $V_{APP}$ is generated from voltage $V_{DC}$.

In step 420, controller 140 selects boost controller 142 based on the logic high level of signal EN.

In step 425, boost controller 142, together with inductor 118, battery 130, transistor 115, and transistor 125 forms boost converter 200 that converts voltage $V_{APP}$ to voltage $V_{BAT}$ to charge battery 130.

In step 407, however, if voltage $V_{DC}$ is determined to be not present, voltage detector 110 generates signal EN having a low logic level in step 445.

In step 450, sense amplifier 120 is turned off. Transistor 105 is also turned off. Voltage $V_{APP}$ is electrically disconnected from voltage $V_{DC}$.

In step 455, signal EN is Low, and controller 140 selects buck controller 146.

In step 460, buck controller 146, together with inductor 118, capacitor 116, transistor 115, and transistor 125 function as buck converter 300 converting voltage $V_{BAT}$ to voltage $V_{APP}$. Stated differently, $V_{BAT}$ serves as a voltage source for voltage $V_{APP}$.

A number of embodiments have been described. It will nevertheless be understood that various modifications may be made without departing from the spirit and scope of the disclosure. For example, the various transistors being shown as a particular dopant type (e.g., N-type or P-type Metal Oxide Semiconductor (NMOS or PMOS)) are for illustration purposes. Embodiments of the disclosure are not limited to a particular type. Selecting different dopant types for a particular transistor is within the scope of various embodiments. The low or high logic level (e.g., Low or High) of the various signals used in the above description is also for illustration purposes. Various embodiments are not limited to a particular level when a signal is activated and/or deactivated. Selecting different levels is within the scope of various embodiments. Different circuits serving as a boost controller 142 and/or a buck controller 146 are within the scope of various embodiments.

The various figures show the inductor/capacitor circuits using discrete inductors and capacitors for illustration only. Equivalent circuitry may be used. For example, an inductive device, circuitry or network (e.g., a combination of inductors, inductive devices, circuitry, etc.) can be used in place of the inductor. Similarly, a capacitive device, circuitry or network (e.g., a combination of capacitors, capacitive devices, circuitry, etc.) can be used in place of the capacitor.

Some embodiments regard a method. In the method, whether a first voltage and/or a voltage source are present is determined. Based on a first result of the determining step, the first voltage is converted to a second voltage. A boost converter is used to convert the second voltage to a third voltage. Alternatively, based on a second result of the determining step, a buck converter is used to convert the third voltage to the second voltage.

Some embodiments regard a circuit comprising an inductive device, a first switch, a second switch, a boost controller, and a buck controller. The inductive device has a first inductive terminal and a second inductive terminal. The first switch has a first terminal, a second terminal, and a third terminal. The second switch has a fourth terminal, a fifth terminal, and a sixth terminal. The first inductive terminal is connected to the first terminal of the first switch and the fourth terminal of the second switch. The third terminal and the sixth terminal are configured to be selectively connected to the boost controller or the buck controller. The boost controller, the inductive device, the first switch, and the second switch are configured to function as a boost converter converting a first voltage to a second voltage. The buck controller, the inductive device, the first switch, and the second switch are configured to function as buck converter converting the second voltage to the first voltage.

Some embodiments regard a circuit comprising a voltage converter, a controller, an inductive switching circuit, a capacitive device, and a charge reservoir. The voltage converter is configured to convert a first voltage to a second voltage. The controller comprises a boost controller and a buck controller. The inductive switching circuit is coupled to the controller and configured to receive the second voltage. The capacitive device has one end configured to receive the second voltage. The boost controller and the buck controller are selectively configured such that the charge reservoir, the boost controller, and the inductive switching circuit function as a boost converter converting the second voltage to a third voltage, and the capacitive device, the buck controller, and the inductive switching circuit are configured to function as a buck converter using the third voltage as a source to provide the second voltage.

The above methods show exemplary steps, but they are not necessarily performed in the order shown. Steps may be added, replaced, changed order, and/or eliminated as appropriate, in accordance with the spirit and scope of disclosed embodiments.

What is claimed is:

1. A method comprising:
   determining whether a first voltage and/or a voltage source generating the first voltage is present at a voltage source terminal by comparing a voltage level at the voltage source terminal with a voltage source reference voltage;

switching an amplifier to an on state in response to a first state of an enable signal and switching the amplifier to an off state in response to a second state of the enable signal, wherein the enable signal is based on the comparing;

communicating a control signal to a transistor, the control signal being based on a difference between a voltage level at the amplifier and a voltage supply reference voltage;

based on a first result of the step of determining,
controlling a voltage level of a second voltage at a first node based on the control signal;
converting the first voltage to the second voltage at the first node;
generating a first pulse width modulated (PWM) signal with a boost controller; and
according to a voltage level at a second node and a voltage level of a first reference voltage, and an output of a first slope compensation circuit, using the boost controller and the first PWM signal to control an inductive switch circuit to convert the second voltage to a third voltage at the second node; and based on a second result of the step of determining,
generating a second PWM signal with a buck controller, wherein the second voltage is electrically connected to the buck controller; and
according to a voltage level at the first node and a voltage level of a second reference voltage, and an output of a second slope compensation circuit, using the buck controller and the second PWM signal to control the inductive switch circuit to convert the third voltage to the second voltage at the first node.

2. The method of claim 1, wherein
the inductive switch circuit includes an inductive device having a first inductive terminal and a second inductive terminal, a first switch having a first terminal, a second terminal, and a third terminal, and a second switch having a fourth terminal, a fifth terminal, and a sixth terminal;
the first inductive terminal is coupled to the first node; the second inductive terminal is coupled to the first terminal of the first switch and the fourth terminal of the second switch; the third terminal and the sixth terminals are selectively coupled to the boost controller or the buck controller; and
the second terminal of the first switch is coupled to the second node.

3. The method of claim 1, further comprising using the third voltage to charge a battery.

4. The method of claim 1, wherein the third voltage is electrically connected to the boost controller.

5. The method of claim 1, wherein the boost controller and the buck controller share a driver to control the inductive switch circuit.

6. The method of claim 1, further comprising using a signal line to reflect the first result and the second result.

7. A circuit comprising:
an inductive device having a first inductive terminal and a second inductive terminal;
a first voltage converter electrically connected to a voltage source and a voltage supply, the voltage supply being electrically connected to the first inductive terminal, the first voltage converter comprising:
a comparator electrically connected to a comparator reference voltage and electrically connected to the voltage source,
an amplifier electrically connected to the comparator and switchable between on and off states in response to an enable signal from the comparator, the amplifier being electrically connected to an amplifier reference voltage and electrically connected to the voltage supply, and
a transistor electrically connected to the amplifier, electrically connected to the voltage source, and electrically connected to the voltage supply;
a first switch having a first terminal, a second terminal, and a third terminal;
a second switch having a fourth terminal, a fifth terminal, and a sixth terminal;
a boost controller configured to generate a first pulse width modulated (PWM) signal; and
a buck controller configured to generate a second PWM signal,
wherein
the second inductive terminal is coupled to the first terminal of the first switch and the fourth terminal of the second switch;
the third terminal and the sixth terminal are configured to be selectively coupled to the boost controller or the buck controller;
the boost controller, the inductive device, the first switch, and the second switch are configured to function as a boost converter converting a first voltage at the first inductive terminal of the inductive device to a second voltage at the second terminal of the first switch according to the first PWM signal, a voltage level at the second terminal of the first switch, and a voltage level of a first reference voltage when a control signal is at a first state; and
the buck controller, the inductive device, the first switch, and the second switch are configured to function as a buck converter converting the second voltage at the second terminal of the first switch to the first voltage at the first inductive terminal of the inductive device according to the second PWM signal, a voltage level at the first inductive terminal of the inductive device, and a voltage level of a second reference voltage when the control signal is at a second state.

8. The circuit of claim 7, further comprising a second voltage converter configured to convert a third voltage to the first voltage.

9. The circuit of claim 8, further comprising a signal line carrying the control signal configured to turn on the second voltage converter and selectively select the boost converter or to turn off the second voltage converter and selectively select the buck converter.

10. The circuit of claim 7, further comprising a voltage detector configured to generate a first signal based on a result indicating whether a third voltage is present.

11. The circuit of claim 10, wherein the third voltage is a direct current voltage converted from an alternating current voltage.

12. The circuit of claim 7, further comprising a battery configured to receive the second voltage as a charging source for the battery.

13. The circuit of claim 7, wherein the boost controller and the buck controller are configured to share a driver configured to drive the third terminal and the sixth terminal.

14. The circuit of claim 7, wherein the boost controller comprises:
a boost controller output;
a slope compensation circuit having an output;
an error amplifier comprising a first input, a second input, and an output, the first input being configured to receive the second voltage, and the second input being configured to receive the first reference voltage; and
an error comparator comprising a first input, a second input, and an output, the first input being coupled with the output of the slope compensation circuit, the second input being coupled with the output of the error amplifier, and the output being coupled with the boost controller output.

15. The circuit of claim 7, wherein the buck controller comprises:
a buck controller output;
a slope compensation circuit having an output;
an error amplifier comprising a first input, a second input, and an output, the first input being configured to receive the first voltage, and the second input being configured to receive the second reference voltage; and
an error comparator comprising a first input, a second input, and an output, the first input being coupled with the output of the slope compensation circuit, the second input being coupled with the output of the error amplifier, and the output being coupled with the buck controller output.

16. A circuit comprising:
a voltage converter configured to convert a first voltage to a second voltage, the voltage converter comprising:
a comparator electrically connected to a comparator reference voltage and electrically connected to a voltage source,
an amplifier electrically connected to the comparator and switchable between on and off states in response to an enable signal from the comparator, the amplifier electrically connected to an amplifier reference voltage and electrically connected to the second voltage, and
a transistor electrically connected to the amplifier, electrically connected to the voltage source, and electrically connected to the second voltage;
a controller having a boost controller configured to generate a first pulse width modulated (PWM) signal and a buck controller configured to generate a second PWM signal;
a capacitive device having at least one end, the at least one end of the capacitive device having the second voltage;
a charge reservoir having at least one end, the at least one end of the charge reservoir having a third voltage; and
an inductive switching circuit coupled to the controller, the at least one end of the capacitive device, and the at least one end of the charge reservoir,
wherein the boost controller and the buck controller are selectively configured such that
the charge reservoir, the boost controller, and the inductive switching circuit function as a boost converter converting the second voltage to the third voltage at the at least one end of the charge reservoir according to the first PWM signal, a voltage level at the at least one end of the charge reservoir, and a voltage level of a first reference voltage when a control signal is at a first state; and
the capacitive device, the buck controller, and the inductive switching circuit function as a buck converter using the charge reservoir as a source to provide the second voltage at the at least one end of the capacitive device according to the second PWM signal, a voltage level at the at least one end of the capacitive device, and a voltage level of a second reference voltage, when the control signal is at a second state.

17. The circuit of claim 16, wherein
the inductive switching circuit comprises an inductive device having a first inductive terminal and a second inductive terminal, a first switch having a first terminal, a second terminal, and a third terminal, and a second switch having a fourth terminal, a fifth terminal, and a sixth terminal;
the first inductive terminal is configured to receive the second voltage;
the second inductive terminal, the first terminal of the first switch, and the fourth terminal of the second switch are coupled together;
the fifth terminal of the second switch is coupled to the charge reservoir; and
the third terminal and the sixth terminal are selectively coupled to the boost controller or the buck controller.

18. The circuit of claim 17, wherein the boost controller and the buck controller are configured to share a driver to control the third terminal and the sixth terminal.

19. The circuit of claim 16, wherein the boost converter and the buck converter are selectively configured based on the first voltage.

20. The circuit of claim 16, wherein the first voltage is a direct current voltage converted from an alternating current voltage.

21. The circuit of claim 16, wherein the boost controller comprises:
a boost controller output;
the first slope compensation circuit having an output;
an error amplifier comprising a first input, a second input, and an output, the first input being coupled with the at least one end of the charge reservoir, and the second input being configured to receive the first reference voltage; and
an error comparator comprising a first input, a second input, and an output, the first input being coupled with the output of the first slope compensation circuit, the second input being coupled with the output of the error amplifier, and the output being coupled with the boost controller output.

22. The circuit of claim 16, wherein the buck controller comprises:
a buck controller output;
the second slope compensation circuit having an output;
an error amplifier comprising a first input, a second input, and an output, the first input being coupled with the at least one end of the capacitive device, and the second input being configured to receive the second reference voltage; and
an error comparator comprising a first input, a second input, and an output, the first input being coupled with the output of the second slope compensation circuit, the second input being coupled with the output of the error amplifier, and the output being coupled with the buck controller output.

* * * * *